(12) United States Patent
Asakawa et al.

(10) Patent No.: US 9,978,475 B2
(45) Date of Patent: May 22, 2018

(54) PRODUCTION METHOD FOR CONDUCTIVE RESIN COMPOSITION, AND CONDUCTIVE RESIN COMPOSITION

(71) Applicant: DAINICHISEIKA COLOR & CHEMICALS MFG. CO., LTD., Chuo-ku (JP)

(72) Inventors: Hisaki Asakawa, Chuo-ku (JP); Masayuki Shibata, Chuo-ku (JP); Noritaka Sakuta, Chuo-ku (JP); Takuma Itoh, Chuo-ku (JP)

(73) Assignee: DAINICHISEIKA COLOR & CHEMICALS MFG. CO., LTD., Chuo-ku (JP)

( * ) Notice: Subject to any disclaimer, the term of this patent is extended or adjusted under 35 U.S.C. 154(b) by 216 days.

(21) Appl. No.: 14/371,857

(22) PCT Filed: Jan. 22, 2013

(86) PCT No.: PCT/US2013/051211
§ 371 (c)(1),
(2) Date: Jul. 11, 2014

(87) PCT Pub. No.: WO2013/125280
PCT Pub. Date: Aug. 29, 2013

(65) Prior Publication Data
US 2014/0361227 A1    Dec. 11, 2014

(30) Foreign Application Priority Data

Feb. 21, 2012 (JP) .................. 2012-035542
Nov. 13, 2012 (JP) .................. 2012-249522

(51) Int. Cl.
| | | |
|---|---|---|
| C01B 31/02 | (2006.01) | |
| B82Y 30/00 | (2011.01) | |
| H01B 1/24 | (2006.01) | |
| C08J 3/205 | (2006.01) | |
| C08J 3/22 | (2006.01) | |
| C08K 7/24 | (2006.01) | |
| C08J 5/00 | (2006.01) | |
| B82Y 40/00 | (2011.01) | |

(52) U.S. Cl.
CPC .............. *H01B 1/24* (2013.01); *C08J 3/205* (2013.01); *C08J 3/226* (2013.01); *C08J 5/005* (2013.01); *C08K 7/24* (2013.01); *B82Y 30/00* (2013.01); *B82Y 40/00* (2013.01); *C08J 2323/06* (2013.01); *C08J 2367/02* (2013.01); *C08J 2369/00* (2013.01); *C08K 2201/001* (2013.01); *C08K 2201/011* (2013.01); *Y10S 977/742* (2013.01); *Y10S 977/783* (2013.01); *Y10S 977/932* (2013.01)

(58) Field of Classification Search
CPC ... H01B 1/04; H01B 1/24; H01B 1/20; B82Y 30/00; B82Y 40/00; H01L 31/04; H01L 1/24; H01L 31/20; H01L 31/24; H01M 8/0243; H01M 4/0409; H01M 4/625; H01M 4/663; C01B 31/0273; C01B 31/0648; C01B 31/02; C01B 32/174
USPC ........... 252/500–511; 423/445 R–447.1, 448, 423/460
See application file for complete search history.

(56) References Cited

U.S. PATENT DOCUMENTS

| | | | |
|---|---|---|---|
| 8,834,826 B2* | 9/2014 | Sato ...................... | B82Y 30/00 252/500 |
| 2004/0262581 A1 | 12/2004 | Rodrigues | |
| 2005/0049393 A1 | 3/2005 | Silvi et al. | |
| 2005/0234218 A1 | 10/2005 | Silvi et al. | |
| 2005/0234219 A1 | 10/2005 | Silvi et al. | |
| 2006/0089487 A1 | 4/2006 | Silvi et al. | |
| 2007/0213450 A1 | 9/2007 | Winey et al. | |
| 2007/0225479 A1 | 9/2007 | Silvi et al. | |
| 2008/0262196 A1* | 10/2008 | Giammattei ........ | B29C 47/0871 528/481 |
| 2010/0210789 A1* | 8/2010 | Seidel ..................... | C08J 3/005 525/53 |
| 2011/0260116 A1* | 10/2011 | Plee ....................... | B82Y 30/00 252/511 |
| 2012/0202114 A1* | 8/2012 | Madray ............... | H01M 4/0404 429/211 |
| 2012/0292578 A1* | 11/2012 | Bacher .................. | B82Y 30/00 252/511 |

FOREIGN PATENT DOCUMENTS

| | | |
|---|---|---|
| JP | 3 74465 | 3/1991 |
| JP | 2005 62475 | 3/2005 |

(Continued)

OTHER PUBLICATIONS

Cooper ("Distribution and alignment of carbon nanotubes and nanofibrils in a polymer matrix." Comp Sc and Tech, 62, pp. 1105-1112, pub 2002).*

(Continued)

*Primary Examiner* — Tri V Nguyen
(74) *Attorney, Agent, or Firm* — Oblon, McClelland, Maier & Neustadt, L.L.P.

(57) ABSTRACT

Provided by the present invention is a conductive resin composition which has, by adding small amount of a carbon nanotube thereto, high conductivity and superior processability including moldability while keeping original physical properties owned by the thermoplastic resin itself. Provided is a method for producing a conductive resin composition, that is, a method for producing a conductive resin composition which contains a carbon nanotube and a thermoplastic resin, wherein the method contains following steps of (A) and (B); namely, (A) a step of mixing and dispersing the carbon nanotube, a solvent, and the thermoplastic resin, thereby obtaining a carbon nanotube resin mixture, and (B) a step of removing the solvent while kneading the carbon nanotube resin mixture. Provided further is a conductive resin composition obtained by the said production method.

4 Claims, No Drawings

(56) References Cited

FOREIGN PATENT DOCUMENTS

| | | |
|---|---|---|
| JP | 2005 68434 | 3/2005 |
| JP | 2006 169353 | 6/2006 |
| JP | 2006 517996 | 8/2006 |
| JP | 2006-306960 A | 11/2006 |
| JP | 2008 231344 | 10/2008 |
| JP | 2011 111562 | 6/2011 |
| WO | WO2011030058 A * | 3/2011 .............. H01M 4/52 |
| WO | WO 2011/060839 A1 | 5/2011 |

OTHER PUBLICATIONS

International Search Report dated May 7, 2013 in PCT/JP13/051211 Filed Jan. 22, 2013.
Extended European Search Report dated Jun. 17, 2015 in Patent Application No. 13751388.3.

* cited by examiner

PRODUCTION METHOD FOR CONDUCTIVE RESIN COMPOSITION, AND CONDUCTIVE RESIN COMPOSITION

TECHNICAL FIELD

The present invention relates to a method for producing a conductive resin composition having superior antistatic property and conductivity and to a conductive resin composition.

BACKGROUND ART

Generally, a resin material has low conductivity with the surface resistivity thereof being in the range of about $10^{14}$ to $10^{16} \Omega/\square$; and thus, it is classified into an insulator material. Because of this, a resin material may be applied for the uses in which an electrical insulating property is required; however, for example, in the uses for a molded article, a film, a sheet, and the like which require antistatic property, it is necessary to provide the resin with conductivity, so that many studies have been carried out with this in mind.

In order to provide a resin material with conductivity, that is, in order to further lower the surface resistivity thereof, it may be effective to disperse into the resin material a conductive material including metal powder, metal fiber, carbon black, graphite, carbon fiber, and carbon nanotube; however, depending on the composition of the mixture and the method for mixing and dispersion thereof, original mechanical characteristics owned by the resin itself are sometimes deteriorated by them. Accordingly, both electric characteristics and mechanical characteristics need to be satisfied in a good balance while affording the resin material with the conductivity.

Under the situation as mentioned above, in Patent Document 1, a resin composition is disclosed with which high conductivity can be afforded to a molded product when the composition is made to contain 0.1 to 50 parts by mass of extremely fine carbon fibril formed of aggregate of a conductive fibrous substance and 99.9 to 50 parts by mass of a synthetic resin.

In Patent Document 2, a resin composition which is obtained by adding a carbon nanotube and a specific surfactant to a hydrophobic thermoplastic resin is disclosed. Furthermore, disclosed in Patent Document 3 is a method in which a carbon nanotube is contacted with a water-soluble polymer or with a surfactant in an aqueous medium, followed by mixing thereof with a polymer latex and then by drying to remove water, and thereafter, by molding the composition thereby obtained.

However, in all of Patent Documents 1 to 3, in order to provide a resin molded product with high conductivity by addition of a conductive material, it was necessary to increase adding amount of the said conductive material. If adding amount of the conductive material is increased, there are problems of deterioration of molding processability and physical properties including mechanical characteristics that are originally owned by the resin itself. Moreover, if adding amount of the conductive material is increased, probability of locating the conductive material on surface of the resin molded product becomes higher; and thus, for example, if the article is a packaging material of an electronic device or a part thereof, the conductive material on surface of the molded product may drop off by friction of the molded product, whereby causing, because of this drop-off conductive material, problems of polluting an environment and giving mechanical damage to the parts and the like of the electric and the electronic device or giving an electrically harmful effect to the same.

Patent Document 1: Japanese Patent Laid-Open Publication No. 1103-74465
Patent Document 2: Japanese Patent Laid-Open Publication No. 2008-231344
Patent Document 3: Japanese Patent Laid-Open Publication No. 2006-517996

SUMMARY OF THE INVENTION

Problems to be Solved by the Invention

In view of the situation mentioned above, the present invention has an object to provide a conductive resin composition having high conductivity and superior processability including moldability while keeping original physical properties owned by the thermoplastic resin itself by addition of small amount of a carbon nanotube thereinto.

Means for Solving the Problems

Inventors of the present invention carried out an extensive investigation to solve the problems mentioned above, and as a result, it was found that if a carbon nanotube resin mixture obtained by mixing and dispersing a carbon nanotube, a solvent, and a thermoplastic resin is subjected to a specific kneading and dispersing treatment wherein the solvent is removed while kneading the mixture, a conductive resin composition having high conductivity and superior moldability while keeping original physical properties of the thermoplastic resin itself could be obtained even if the adding amount of the carbon nanotube is small; and based on this finding, the present invention could be accomplished.

That is, the present invention provides the following (1) to (7).

(1) A method for producing a conductive resin composition, that is, a method for producing a conductive resin composition which contains a carbon nanotube and a thermoplastic resin, wherein the method contains following steps of (A) and (B):
(A) a step of mixing and dispersing the carbon nanotube, a solvent, and the thermoplastic resin, thereby obtaining a carbon nanotube resin mixture, and
(B) a step of removing the solvent while kneading the carbon nanotube resin mixture.
(2) The method for producing a conductive resin composition according to the item (1) described above, wherein the carbon nanotube and the thermoplastic resin are mixed, and then the solvent is added thereinto to obtain the carbon nanotube resin mixture.
(3) The method for producing a conductive resin composition according to the item (1) or (2) described above, wherein mass ratio of the carbon nanotube to the thermoplastic resin in the carbon nanotube resin mixture is in the range of 0.1:100 to 100:100.
(4) The method for producing a conductive resin composition according to any of the items (1) to (3) described above, wherein the solvent is water and/or an alcohol.
(5) The method for producing a conductive resin composition according to any of the items (1) to (4) described above, wherein the carbon nanotube resin mixture further contains a surfactant.
(6) The method for producing a conductive resin composition according to the item (5) described above, wherein amount of the surfactant is more than 0 parts by mass and 40 parts or less by mass relative to 100 parts by mass of total of the surfactant and the carbon nanotube in the carbon nanotube resin mixture.

(7) A conductive resin composition obtained by the method according to any of the items (1) to (6) described above.

Effect of the Invention

According to the present invention, by addition of small amount of a carbon nanotube, a conductive resin composition having high conductivity and superior processability including moldability can be obtained while keeping original physical properties owned by the thermoplastic resin itself; and thus, for example, a molded article, a film, a sheet, and the like may be provided that are formed of the conductive resin composition useful for the application in which conductivity is required.

MODES FOR CARRYING OUT THE INVENTION

At first, the method for producing a conductive resin composition of the present invention will be explained.

Method for Producing a Conductive Resin Composition

The method for producing a conductive resin composition of the present invention is characterized by that the method contains the following steps of (A) and (B):

(A) a step of mixing and dispersing the carbon nanotube, a solvent, and a thermoplastic resin, thereby obtaining a carbon nanotube resin mixture, and
(B) a step of removing the solvent while kneading the carbon nanotube resin mixture (hereunder, this step is sometimes referred to as "step of kneading with solvent removal").

In the method for producing a conductive resin composition of the present invention, the method for preparation of the carbon nanotube resin mixture comprising a carbon nanotube, a thermoplastic resin, and a solvent is not particularly restricted; however, for example, the following methods may be used.

(a) After a carbon nanotube and a thermoplastic resin are mixed and dispersed, a solvent is added thereinto, and then mixing thereof is further carried out.
(b) After a carbon nanotube and a solvent are mixed, a thermoplastic resin is added thereinto, and then mixing and dispersion thereof are further carried out.
(c) A carbon nanotube, a solvent, and a thermoplastic resin are mixed and dispersed all at once.

Among (1) to (3), in view of easy mixing and high dispersion by a disperser including a super mixer and a Henschel mixer, the preparation method of (a) is preferable.

Hereunder, the steps included in the present invention will be explained.

Step of Mixing and Dispersion:

In the step of mixing and dispersion, a thermoplastic resin is mixed and dispersed with a carbon nanotube and a solvent in a specific mass ratio, thereby obtaining the carbon nanotube resin mixture.

In the step of mixing and dispersion, for example, it is preferable that after a thermoplastic resin and a carbon nanotube are mixed and dispersed to prepare a mixed disperse body of the thermoplastic resin and the carbon nanotube, a solvent be added to the mixed disperse body of the thermoplastic resin and the carbon nanotube thus prepared to obtain the carbon nanotube resin mixture. The above-mentioned method is in the case of utilizing the method (a); however, even in the methods (b) and (c), mixing and dispersion can be carried out as well.

The method of mixing and dispersion is not particularly restricted, provided that the mixing and dispersion can be done uniformly; and thus, illustrative example of the equipment for it includes those used in heretofore known methods, such as for example, a Henschel mixer, a super mixer, a ultrasonic homogenizer, a spiral mixer, a planetary mixer, a disperser, and a hybrid mixer. These dispersers may be used solely or as a combination of two or more of them. Especially in view of high dispersibility of the carbon nanotube into the thermoplastic resin as well as suppression of the damage to the carbon nanotube, a Henschel mixer, a super mixer, and an ultrasonic homogenizer are preferably used. In addition, after this treatment, the dispersion may be further intensified by using a ball mill, a vibration mill, a sand mill, a roll mill, or the like, provided that this treatment is done in a way such that the carbon nanotube may not be damaged.

Meanwhile, the treatment temperature, the treatment time, and the like may be adjusted arbitrarily.

Step of Kneading with Solvent Removal:

In the step of kneading with solvent removal, the solvent is removed while kneading the carbon nanotube resin mixture obtained in the step of mixing and dispersion as mentioned above. The kneading method therein is not particularly restricted; and thus, illustrative example of the equipment for it includes those used in heretofore known methods, such as an extruder, a kneader mixer, and a Bunbury mixer.

The treatment temperature and the treatment pressure are different depending on the thermoplastic resin, the solvent, and so forth to be used; and thus, they may be adjusted arbitrarily. However, as will be mentioned later, the treatment is preferably done under high temperature state, so that the treatment temperature is preferably in the range of 100 to 370° C.

In this step, after the above-mentioned treatment, the conductive resin composition finally granulated to pellets or flakes will be obtained.

Alternatively, after a good containing the carbon nanotube in high concentration (master batch) is mixed with a raw material resin at a prescribed ratio, the resulting mixture may be granulated by using a kneader such as the extruder and the roll as mentioned before.

In the present invention, it is not completely clear the reason why dispersibility is enhanced if the solvent coexists during the time of kneading the resin with the carbon nanotube. However, inventors of the present invention considered this as following by taking, for example, the case in which water is used as the solvent, because it was found that the resin and the carbon nanotube could be kneaded readily and efficiently when the mixture containing water was kneaded in a locally closed system under the high temperature state.

In Table 1, the saturated vapor pressure and the saturated vapor amount of water in a closed system are shown. As can be seen in Table 1, if the saturated vapor pressure at 100° C. is taken 1 atmosphere, it is then about 16 atmospheres at 200° C., and about 92 atmospheres at 300° C., suggesting that the carbon nanotube is kneaded while being kept under high pressure water vapor. At the same time, if the saturated vapor amount at 100° C. is taken 1, it is then about 13 times at 200° C., and about 60 times at 300° C., suggesting that the carbon nanotube is kneaded while being kept under high density water vapor. Accordingly, the carbon nanotubes which are aggregated and tangled complicatedly may be detangled by molecular movement of the high-density water vapor at high temperature and high pressure in the processing member (closed system) of a processing machine such as the afore-mentioned extruder used in the present invention; and on top of this, the detangled carbon nanotubes are kneaded with the molten resin, so that they may be readily dispersed into the resin.

Furthermore, it is thought that by adding a surfactant, penetration of the water vapor into the carbon nanotubes may be facilitated thereby further enhancing the dispersion effect.

TABLE 1

| Set temperature (° C.) | Saturated vapor pressure | | Saturated vapor amount | |
|---|---|---|---|---|
| | (MPa) | Relative to 100° C. | (ppm) | Relative to 100° C. |
| 23 | 0.0028 | 0.027 | 20.6 | 0.034 |
| 100 | 0.102 | 1 | 594 | 1 |
| 150 | 0.49 | 4.8 | 2520 | 4.24 |
| 200 | 1.65 | 16.1 | 7540 | 12.7 |
| 250 | 4.30 | 42.1 | 17800 | 30.0 |
| 300 | 9.41 | 92.1 | 35600 | 59.9 |

The resin composition of the present invention may be added arbitrarily by various additives, such as a stabilizer, an antioxidant, a plasticizer, a UV absorber, a lubricant, a filler, a colorant, and a flame retardant.

The resin composition of the present invention may be used as an article by molding by a heretofore knowing molding method. Illustrative example of the molding method includes injection molding, extrusion molding, and press molding; and in addition, heretofore known composite molding technologies may be used such as foam molding, two-color molding, insert molding, outsert molding, and in-mold molding. Illustrative example of the article includes an injection molded article, a sheet, an unstretched film, a stretched film, extrusion molded articles such as a round bar and an extruded heterotypic article, a fiber, and a filament.

Alternatively, the resin composition of the present invention may also be used, for example, as a solution or a suspended solution thereof; and thus, it may be used for an adhesive, a paste, a paint, and a coating material.

As discussed above, according to the production method of the present invention, by a specific treatment to remove a solvent while kneading the carbon nanotube resin composition which contains the said solvent, a conductive resin composition having high conductivity while keeping original physical properties owned by the thermoplastic resin itself and having superior processability including moldability can be obtained.

Next, the conductive resin composition obtained by the production method of the present invention will be explained.

Conductive Resin Composition

The conductive resin composition obtained by the production method of the present invention is the one that is obtained by removing a solvent while kneading the carbon nanotube resin composition comprising a carbon nanotube, a thermoplastic resin, and the said solvent.

Carbon Nanotube:

The carbon nanotube to be used in the present invention may be any of a monolayer carbon nanotube and a multilayer carbon nanotube; however, preferably a multilayer carbon nanotube is used because of an affinity with a resin, an electric characteristic, and a mechanical characteristic.

Number of the layers in the multilayer carbon nanotube is preferably in the range of 20 to 50 layers. Number of the layers in the multilayer carbon nanotube within the afore-mentioned range is preferable because a good balance can be obtained among the conductivity and the mechanical characteristics of the carbon nanotube, improvement effects of the resin characteristics when it is blended with the resin, and maintenance of the other original characteristics owned by the resin itself.

In addition, diameter of the carbon nanotube is preferably in the range of 10 to 30 nm.

In the multilayer carbon nanotube to be used in the present invention, content of the carbon nanotube having 20 to 50 layers is, when it is made to a conductive resin composition, preferably 50% or more in the totality of the carbon nanotube contained in the said conductive resin composition. The identification of the layers may be done as following. A super thin piece of the conductive resin composition which contains the carbon nanotube having 20 to 50 layers and the carbon nanotube other than the foregoing is observed by a transmission electron microscope with the 200000 magnification to count the number of the fibrous nanotubes which can be seen in the viewing field of the said transmission electron microscope; and if the number of the carbon nanotubes having 20 to 50 layers in the viewing field is 50% or more, then it is judged to meet the condition.

The graphite structure in a cylindrical form which is characteristic to the carbon nanotube may be checked by a high resolution transmission electron microscope. The graphite layers are better when it can be seen more clearly in the linear form by the high resolution transmission electron microscope; however, it may be allowed even if the graphite layer is rumpled. The rumpled graphite layer is sometimes defined as the carbon nanofiber; in the present invention, however, the carbon nanofiber like this is included in the carbon nanotube.

Generally, the carbon nanotube to be used in the present invention may be produced by a laser abrasion method, an arc discharge method, a thermal CVD method, a plasma CVD method, a gas phase method, a flaming method, or the like; and there is no particular restriction in it. However, the method to produce the carbon nanotube by the thermal CVD method by using acetylene as a raw material and zeolite as a catalyst carrier, which is the method reported by Shinohara, et al., is particularly preferable because the multilayer carbon nanotube which has high purity as well as a superior graphite structure can be obtained without special purification even though an amorphous carbon cover due to thermal decomposition thereof is somewhat observed (Chemical Physics Letters, p. 117-124, 303 (1999)).

Alternatively, the carbon nanotube which is treated with a coupling agent in advance may also be used. The coupling agent may be exemplified by an isocyanate compound, an organic silane compound, an organic titanate compound, an organic borane compound, an epoxy compound, and so forth.

Solvent:

The solvent to be used in the present invention is not particularly restricted, so that any solvent may be used, provided that it can be removed by evaporation from the system during the time of kneading the carbon nanotube resin mixture, and that it has a boiling point such that it will not remain in the resin composition to be obtained. Specifically, water and an alcohol are preferably used in consideration of effects to the working environment, cost, handling properties, and so forth; and in particular, water is preferably used. In the case that an alcohol is used, ethanol is preferable. Alternatively, water and an alcohol may be used together.

Amount of the solvent is not particularly restricted, provided that the amount is not less than the amount necessary to disperse the carbon nanotube and not more than the amount that the solvent can be removed by the kneading equipment. Specifically, the mass ratio of the carbon nanotube to the solvent in the carbon nanotube resin mixture is preferably in the range of 100:100 to 100:1000, more preferably in the range of 100:100 to 100:900, or especially preferably in the range of 100:100 to 100:800.

Surfactant:

In the carbon nanotube resin mixture used in the present invention, a surfactant may be added furthermore. By adding the surfactant thereto, a solvent which contains the said surfactant can penetrate into the tangled carbon nanotube aggregate, thereby giving rise to the enhanced effect to detangle the carbon nanotube.

The foregoing surfactant may be exemplified by an ionic surfactant and a nonionic surfactant. The anionic surfactant of the ionic surfactant may be exemplified by a sulfate ester type, a phosphate ester type, a sulfonate ester type, and the like; and the cationic surfactant thereof may be exemplified by a quaternary ammonium salt and the like. The amphoteric surfactant may be exemplified by an alkyl betaine type, an amide betaine type, an amine oxide type, and the like. Furthermore, the nonionic surfactant may be exemplified by an aliphatic acid ester, a sorbitan aliphatic acid ester, and the like.

The compounding amount of the surfactant is not particularly restricted, provided that the amount is within the range not causing deterioration of physical properties of the conductive resin composition to be obtained; however, the amount of the surfactant is preferably more than 0 parts by mass and 40 parts or less by mass relative to 100 parts by mass of the total of the carbon nanotube and the surfactant in the carbon nanotube resin mixture.

Thermoplastic Resin:

The thermoplastic resin to be used in the present invention may be exemplified by a polyethylene resin, a polypropylene resin, a polystyrene resin, a rubber-modified polystyrene resin, an acrylonitrile-styrene resin, an acrylonitrile-butadiene-styrene resin, a polycarbonate resin, a polyamide resin, a polyethylene terephthalate resin, a polybutylene terephthalate resin, a polyacetal resin, a polyether sulfone resin, a polyether imide resin, a polyether ether ketone resin, an acryl resin, and the like.

There is no particular restriction as to the form of the thermoplastic resin to be used in the present invention; however, in the case that it is a powder form or a pellet form, the particle diameter thereof is preferably in the range of 0.01 to 3 mm. By setting the particle diameter thereof within the above-mentioned range, the carbon nanotubes can be detangled by the thermoplastic resin readily during the time of preparing the carbon nanotube resin mixture; and in addition, the kneading process may be executed more easily.

In the composition of the carbon nanotube resin mixture to be used in the present invention, the mass ratio of the carbon nanotube to the thermoplastic resin is preferably in the range of 0.1:100 to 100:100, more preferably in the range of 0.5:100 to 50:100, particularly more preferably in the range of 0.5:100 to 30:100, or utmost preferably in the range of 1:100 to 30:100. If the carbon nanotube is present with the mass ratio of 0.1:100 or more, the conductive resin composition thereby obtained can have superior conductivity; and thus, this mass ratio range is preferable. On the other hand, if the said ratio is 100:100 or less, the obtained conductive resin composition or the conductive resin composition obtained by diluting the master batch thereof with the resin may secure the original physical properties owned by the resin itself; and thus, this mass ratio range is preferable.

EXAMPLES

Hereunder, the present invention will be explained in more detail by Examples; however, the present invention is not restricted at all by these Examples.

Meanwhile, "parts" and "%" appearing in the following context are respectively based on the mass unless otherwise specifically mentioned.

Evaluations of the conductive resin composition obtained by Examples and Comparative Examples were carried out by the methods shown below.

(a) Surface Resistivity

The pellets obtained by using an extruder are extrusion-molded to obtain a sheet having thickness of about 0.5 mm and width of 50 mm by using the extruder equipped with a belt die (NV-20, manufactured by Marth Seiki Co., Ltd.); and the surface resistivity thereof was measured by using the low resistivity tester Loresta GP (manufactured by Mitsubishi Chemical Corp.) and the high resistivity tester Hiresta UP (manufactured by Mitsubishi Chemical Corp.).

(b) Dispersion State of Carbon Nanotube

The pellets obtained by using an extruder are press-molded to obtain a sheet (10 mm×10 mm×20 μm); and the dispersion state of the carbon nanotube in the resin was evaluated by using an optical microscope. The evaluations of A to E were made in accordance with the sizes of the aggregate thereof as shown below.

A: Size of the aggregate is less than 10 μm
B: Size of the aggregate is less than 20 μm
C: Size of the aggregate is less than 50 μm
D: Size of the aggregate is less than 100 μm
E: Size of the aggregate is 100 μm or more (c) Flexural Modulus In accordance with JIS K7171, by using the pellets obtained by using an extruder, a dumbbell was prepared by using an injection molding machine; and then, the flexural modulus thereof was measured by a bending test machine.

(d) Tensile Elongation at Break

In accordance with JIS K7161, by using the pellets obtained by using an extruder, a dumbbell was prepared by using an injection molding machine; and then, the tensile elongation at break thereof was measured by a tensile test machine.

Example 1

Into a mixer were taken 3 parts of the carbon nanotube (VGCF-X, manufactured by Showa Denko K. K.) and 97 parts of low-density polyethylene having the particle diameter in the range of 0.1 to 1 mm (Suntec F2270, manufactured by Ashahi Kasei Chemicals Corp.); and they were mixed by stirring at 25° C. for 3 minutes; and then, after 5 parts of water was added to the mixer as the solvent, the resulting mixture was stirred at 25° C. for 2 minutes to obtain the carbon nanotube resin mixture.

Thus obtained carbon nanotube resin mixture was kneaded in a molten state at the treatment temperature of 180° C. by using the biaxial extruder (TEX 30 mm, manufactured by The Japan Steel Works, Ltd.) while removing water as a solvent by evaporation through the vent of the biaxial extruder, thereby the conductive resin composition of the present invention in the form of pellets was obtained. From the conductive resin composition thus obtained, a sheet having thickness of about 0.5 mm for evaluation of physical properties including surface resistivity was prepared by using the afore-mentioned extruder equipped with a belt die. In addition, in order to evaluate dispersibility of the carbon nanotube in the conductive resin composition, a sheet having thickness of about 20 μm was prepared by press-molding the conductive resin composition; and then, the aggregate state of the carbon nanotube in the resin was observed by using an optical microscope. The results of them are shown in Table 2.

Example 2

The procedure of Example 1 was repeated, except that the amount of water was changed to 10 parts as shown in Table 2, to obtain the conductive resin composition in the form of pellets. In addition, by using the conductive resin composition thus obtained, the sheet for evaluation of the physical properties thereof and the sheet for evaluation of dispersibility thereof were prepared in a similar manner to that of Example 1. The results of them are shown in Table 2.

Example 3

The procedure of Example 1 was repeated, except that the amount of water was changed to 5 parts and that 0.1 part of a surfactant (Hostapur SAS 93, manufactured by Clariant AG) was further added, to obtain the carbon nanotube resin mixture.
Subsequently, similarly to Example 1, the conductive resin composition in the form of pellets was prepared; and by using this conductive resin composition, the sheet for evaluation of physical properties thereof and the sheet for evaluation of dispersibility thereof were prepared. The evaluation results thereof are shown in Table 2.

Example 4 to Example 14

Procedure of Example 3 was repeated, except that amounts of the carbon nanotube, the low-density polyethylene, water, ethanol, and the surfactant were changed to those shown in Table 2, to obtain the respective conductive resin compositions in the form of pellets; and similarly to Example 1, by using each of these conductive resin compositions, the sheet for evaluation of physical properties thereof and the sheet for evaluation of dispersibility thereof were prepared. The evaluation results thereof are shown in Table 2.

Example 15

Into a mixer were taken 4 parts of the carbon nanotube (VGCF-X, manufactured by Showa Denko K. K.) and 96 parts of polyethylene terephthalate (PET) having the particle diameter in the range of 0.05 to 1.1 mm (Unipet BK2180, manufactured by Nippon Unipet Co., Ltd.); and they were mixed by stirring at 25° C. for 3 minutes; and then, after 10 parts of water was added to the mixer as the solvent, the resulting mixture was stirred at 25° C. for 2 minutes to obtain the carbon nanotube resin mixture.
This carbon nanotube resin mixture was kneaded in a molten state at the treatment temperature of 270° C. by using the biaxial extruder (TEX 30 mm, manufactured by The Japan Steel Works, Ltd.) while removing water as a solvent by evaporation through the vent of the biaxial extruder, thereby the conductive resin composition of the present invention in the form of pellets was obtained; and similarly to Example 1, by using this conductive resin composition, the sheet for evaluation of physical properties thereof and the sheet for evaluation of dispersibility thereof were prepared. The evaluation results thereof are shown in Table 2.

Example 16

Into a mixer were taken 3 parts of the carbon nanotube (VGCF-X, manufactured by Showa Denko K. K.) and 97 parts of polycarbonate resin having the particle diameter in the range of 0.2 to 1 mm (Panlite L1225WP, manufactured by Teijin Chemicals, Ltd.); and they were mixed by stirring at 25° C. for 3 minutes; and then, after 10 parts of water was added to the mixer as the solvent, the resulting mixture was stirred at 25° C. for 2 minutes to obtain the carbon nanotube resin mixture.
This carbon nanotube resin mixture was kneaded in a molten state at the treatment temperature of 290° C. by using the biaxial extruder (TEX 30 mm, manufactured by The Japan Steel Works, Ltd.) while removing water as a solvent by evaporation through the vent of the biaxial extruder, thereby the conductive resin composition of the present invention in the form of pellets was obtained; and similarly to Example 1, by using this conductive resin composition, the sheet for evaluation of physical properties thereof and the sheet for evaluation of dispersibility thereof were prepared. The evaluation results thereof are shown in Table 2.

Comparative Example 1

The procedure of Example 1 was repeated, except that the amount of water was changed to 0 parts as shown in Table 2, to obtain the conductive resin composition in the form of pellets. In addition, by using the conductive resin composition thus obtained, the sheet for evaluation of the physical properties thereof and the sheet for evaluation of dispersibility thereof were prepared in a similar manner to that of Example 1. The evaluation results thereof are shown in Table 2.

Comparative Example 2 to Comparative Example 4

The procedure of Example 3 was repeated, except that the amounts of water and ethanol were changed to 0 parts, and that the amount of the surfactant was changed as shown in Table 2, to obtain the respective conductive resin compositions in the form of pellets. In addition, by using the respective conductive resin compositions thus obtained, the sheet for evaluation of the physical properties thereof and the sheet for evaluation of dispersibility thereof were prepared in a similar manner to that of Example 1. The evaluation results of them are shown in Table 2.

Comparative Example 5

The carbon nanotube resin mixture prepared in Example 7 was dried at 90° C. for 3 hours, and then kneaded in a molten state in an extruding machine to obtain the conductive resin composition in the form of pellets. In addition, by using the conductive resin compositions thus obtained, the sheet for evaluation of the physical properties thereof and the sheet for evaluation of dispersibility thereof were prepared in a similar manner to that of Example 1. The evaluation results of them are shown in Table 2.

Comparative Example 6

The procedure of Example 15 was repeated, except that the amount of water was changed to 0 parts as shown in Table 2, to obtain the conductive resin composition in the form of pellets. In addition, by using the conductive resin composition thus obtained, the sheet for evaluation of the physical properties thereof and the sheet for evaluation of dispersibility thereof were prepared in a similar manner to that of Example 1. The evaluation results of them are shown in Table 2.

Comparative Example 7

The procedure of Example 16 was repeated, except that the amount of water was changed to 0 parts as shown in Table 2, to obtain the conductive resin composition in the form of pellets. In addition, by using the conductive resin composition thus obtained, the sheet for evaluation of the physical properties thereof and the sheet for evaluation of dispersibility thereof were prepared in a similar manner to that of Example 1. The evaluation results of them are shown in Table 2.

Reference Example 1 to Reference Example 3

The same evaluation tests of physical properties of the respective single bodies of three thermoplastic resins used in Examples and Comparative Examples, namely, low-density polyethylene, polyethylene terephthalate, and polycarbonate resin, were carried out; and the results thereof are shown as Reference Examples 1 to 3 in Table 2.

TABLE 2

| | LDPE | PET | PC | Carbon nanotube | Water | Ethanol | Surfactant | Dispersion state | Surface resistivity ($\Omega/\square$) | Flexural modulus (MPa) | Tensile elongation at break (%) |
|---|---|---|---|---|---|---|---|---|---|---|---|
| Example 1 | 97 | | | 3 | 5 | | | C | $4 \times 10^3$ | 175 | 500 |
| Example 2 | 97 | | | 3 | 10 | | | B | $4 \times 10^2$ | 178 | 540 |
| Example 3 | 97 | | | 3 | 5 | | 0.1 | B | $2 \times 10^3$ | 178 | 550 |
| Example 4 | 97 | | | 3 | 5 | | 0.5 | B | $2 \times 10^3$ | 177 | 560 |
| Example 5 | 97 | | | 3 | 5 | | 1 | B | $1 \times 10^3$ | 175 | 560 |
| Example 6 | 97 | | | 3 | 5 | 5 | | B | $3 \times 10^2$ | 181 | 570 |
| Example 7 | 97 | | | 3 | 10 | | 0.1 | B | $4 \times 10^2$ | 180 | 560 |
| Example 8 | 97 | | | 3 | 10 | | 0.5 | A | $4 \times 10^2$ | 178 | 600 |
| Example 9 | 97 | | | 3 | 10 | | 1 | B | $2 \times 10^2$ | 175 | 570 |
| Example 10 | 97 | | | 3 | 20 | | 1 | A | $2 \times 10^2$ | 180 | 620 |
| Example 11 | 97 | | | 3 | | 10 | | A | $3 \times 10^2$ | 175 | 610 |
| Example 12 | 90 | | | 10 | 20 | | | B | $2 \times 10^0$ | 210 | 450 |
| Example 13 | 80 | | | 20 | 30 | | | B | $3 \times 10^{-2}$ | 250 | 380 |
| Example 14 | 99 | | | 1 | 3 | | | A | $8 \times 10^{10}$ | 170 | 660 |
| Example 15 | | 96 | | 4 | 10 | | | A | $1 \times 10^3$ | 2200 | 220 |
| Example 16 | | | 97 | 3 | 10 | | | A | $2 \times 10^3$ | 2300 | 70 |
| Comparative Example 1 | 97 | | | 3 | | | | E | $4 \times 10^5$ | 175 | 400 |
| Comparative Example 2 | 97 | | | 3 | | | 0.1 | E | $7 \times 10^4$ | 178 | 450 |
| Comparative Example 3 | 97 | | | 3 | | | 0.5 | E | $4 \times 10^4$ | 177 | 400 |
| Comparative Example 4 | 97 | | | 3 | | | 1 | E | $3 \times 10^4$ | 175 | 460 |
| Comparative Example 5 | 97 | | | 3 | 10 | | 0.5 | E | $1 \times 10^5$ | 180 | 470 |
| Comparative Example 6 | | 96 | | 4 | | | | E | $1 \times 10^6$ | 2210 | 110 |
| Comparative Example 7 | | | 97 | 3 | | | | E | $3 \times 10^6$ | 2350 | 50 |
| Reference Example 1 | 100 | | | | | | | — | $3 \times 10^{16}$ | 170 | 650 |
| Reference Example 2 | | 100 | | | | | | — | $5 \times 10^{15}$ | 2000 | 250 |
| Reference Example 3 | | | 100 | | | | | — | $6 \times 10^{14}$ | 2100 | 90 |

Notes
LDPE: Low-density polyethylene
PET: Polyethylene terephthalate
PC: Polycarbonate

INDUSTRIAL APPLICABILITY

The conductive resin composition of the present invention may be used in the forms of a pellet, a master batch, a solution, or a suspended solution. Specifically, because the conductive resin composition has high conductivity as well as superior processability while keeping original physical properties owned by the resin itself, this may be used not only in the uses requiring the antistatic property, including an article, a film, and a sheet, but also in the uses for an adhesive, a paste, a paint, and a coating material.

The invention claimed is:
1. A method for producing a conductive resin composition, comprising:
   mixing a carbon nanotube and a thermoplastic resin and further adding and mixing water to obtain a carbon nanotube resin mixture; and removing water from the carbon nanotube resin mixture while kneading at a treatment temperature of 100 to 370° C. to obtain the conductive resin composition;

wherein:

the thermoplastic resin is a polyethylene resin, a polypropylene resin, a polystyrene resin, a rubber-modified polystyrene resin, an acrylonitrile-styrene resin, an acrylonitrile-butadiene-styrene resin, a polycarbonate resin, a polyamide resin, a polyethylene terephthalate resin, a polybutylene terephthalate resin, a polyacetal resin, a polyether sulfone resin, a polyether imide resin, a polyether ether ketone resin, or an acryl resin;

the thermoplastic resin has a particle diameter of 0.01 to 3 mm;

a mass ratio of the carbon nanotube to the thermoplastic resin in the carbon nanotube resin mixture is 0.5:100 to 50:100; and water is added to the carbon nanotube and the thermoplastic resin in an amount of 100 to 800 parts by mass relative to 100 parts by mass of the carbon nanotube in the carbon nanotube resin mixture.

2. The method for producing a conductive resin composition according to claim 1, wherein the carbon nanotube resin mixture further comprises a surfactant.

3. The method for producing a conductive resin composition according to claim 2, wherein the amount of the surfactant is greater than 0 but less than or equal to 40 parts by mass when compared to the carbon nanotube mass in the carbon nanotube resin mixture.

4. The method for producing a conductive resin composition according to claim 1, wherein the mass ratio of the carbon nanotube to the thermoplastic resin in the carbon nanotube resin mixture is in the range of 1:100 to 30:100.

* * * * *